United States Patent
Shull et al.

(10) Patent No.: US 6,782,783 B2
(45) Date of Patent: Aug. 31, 2004

(54) SLIDE MITER SAW

(75) Inventors: Steven A. Shull, Parkville, MD (US); Brian P. Wattenbach, Columbia, MD (US); Warren A. Ceroll, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/205,806

(22) Filed: Jul. 26, 2002

(65) Prior Publication Data

US 2004/0016333 A1 Jan. 29, 2004

(51) Int. Cl.[7] ......................... B23D 45/04; B23D 45/14; B27B 5/20; B27B 5/36; B26D 1/16
(52) U.S. Cl. ................. 83/471.3; 83/486.1; 83/581; 83/477.1; 83/489; 83/490; 144/285
(58) Field of Search ................ 83/471.3, 473, 83/581, 699.51, 471, 485, 471.2, 477.1, 490, 574, 486.1; D09/424, 437; 206/349, 223; 220/844, 843, 4.21, 4.23, 4.22, 4.24, 4.32, 507, 553, 212.5, 810, 820, 845, 796, 601, 604, 661, FOR 105; 144/285

(56) References Cited

U.S. PATENT DOCUMENTS

| | | | | |
|---|---|---|---|---|
| 1,956,835 A | * | 5/1934 | Roemer | 83/471.3 |
| 2,786,500 A | | 3/1957 | Unterfranz | |
| 2,788,889 A | * | 4/1957 | Turnbow | 206/576 |
| 3,259,232 A | * | 7/1966 | Elson et al. | 206/349 |
| 3,586,079 A | * | 6/1971 | Collins et al. | 144/35.1 |
| 4,152,961 A | * | 5/1979 | Batson | 83/471.3 |
| 4,537,105 A | | 8/1985 | Bergler | |
| 4,611,713 A | * | 9/1986 | Byrns | 206/349 |
| 4,784,192 A | * | 11/1988 | Raggiotti | 144/35.2 |
| 5,060,548 A | * | 10/1991 | Sato et al. | 83/471.3 |
| 5,241,888 A | * | 9/1993 | Chen | 83/471.3 |
| 5,421,228 A | * | 6/1995 | Fukinuki | 83/471.3 |
| 5,797,488 A | * | 8/1998 | Yemini | 206/349 |
| 5,802,943 A | * | 9/1998 | Brunson et al. | 83/471.3 |
| 5,823,085 A | * | 10/1998 | Kondo et al. | 83/471.3 |
| 5,839,339 A | | 11/1998 | Sasaki et al. | |
| 5,957,021 A | * | 9/1999 | Meredith et al. | 83/397 |
| 6,016,732 A | * | 1/2000 | Brault et al. | 83/471.3 |
| 6,035,754 A | * | 3/2000 | Stumpf et al. | 83/471.3 |
| D431,108 S | * | 9/2000 | Lewis et al. | D3/276 |
| 6,315,154 B1 | * | 11/2001 | Newby, Sr. | 220/844 |

FOREIGN PATENT DOCUMENTS

DE         84 27 020          12/1984

OTHER PUBLICATIONS

P. Fanti, European Search Report for Application Number EP 03 01 6198, Sep. 17, 2003, Munich.
Annex to the European Search Report on European Patent Application No. EP 03 01 6198.

* cited by examiner

Primary Examiner—Boyer D. Ashley
(74) Attorney, Agent, or Firm—Adan Ayala

(57) ABSTRACT

The miter saw has a base, a table rotatably attached to the base, a support housing connected to the table, a rail slidably connected to the support housing, and a saw assembly pivotally attached to the rail and movable between a front position and a rear position. The saw assembly has a trunnion disposed on the rail, a pivot arm pivotally attached to the trunnion, an upper blade guard connected to the pivot arm, a motor attached to the upper blade guard, and a blade driven by the motor. The miter saw also has a carrying handle provided on the rail.

19 Claims, 2 Drawing Sheets

SLIDE MITER SAW

FIELD OF THE INVENTION

This invention relates generally to slide miter saws.

BACKGROUND OF THE INVENTION

Slide miter saws are well known in the art as they provide extended cutting range over non-sliding miter saws. Like non-sliding miter saws, the slide miter saws have a base, a rotatable table attached to the base, a saw assembly including a motor and a blade driven by the motor, where the saw assembly is pivoted downwardly for cutting a workpiece disposed on the base and table, and a sliding fence assembly connected to the base for supporting a workpiece. However, slide miter saws enable the user to move the saw assembly horizontally along the table.

Most slide miter saws accomplish this by connecting the saw assembly to at least one rail, which is slidably attached to a support housing connected to the table (see, e.g., U.S. Pat. No. 6,067,885). With such arrangement, the user would pull the saw assembly forwardly, move the saw assembly downwardly, then push the saw assembly rearwardly for cutting the workpiece.

While typical slide miter saws have handles on the saw assembly for carrying, they still are unwieldy because of their weight distribution. Thus, it is desirable to provide an improved means for carrying a slide miter saw.

SUMMARY OF THE INVENTION

In accordance with the present invention, an improved miter saw is employed. The miter saw includes a base, a table rotatably attached to the base, a support housing connected to the table, at least one rail slidably connected to the support housing, a saw assembly pivotally attached to the at least one rail and movable between a front position and a rear position, the saw assembly comprising a trunnion disposed on the at least one rail, a pivot arm pivotally attached to the trunnion, an upper blade guard connected to the pivot arm, a motor attached to the upper blade guard, and a blade driven by the motor, and a carrying handle provided on the at least one rail.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
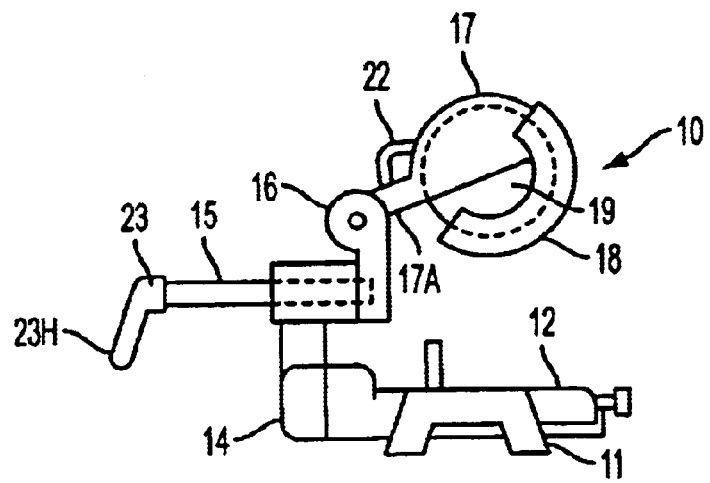
FIG. 1 is a side view of a slide miter saw according to the invention.
Figure 2:
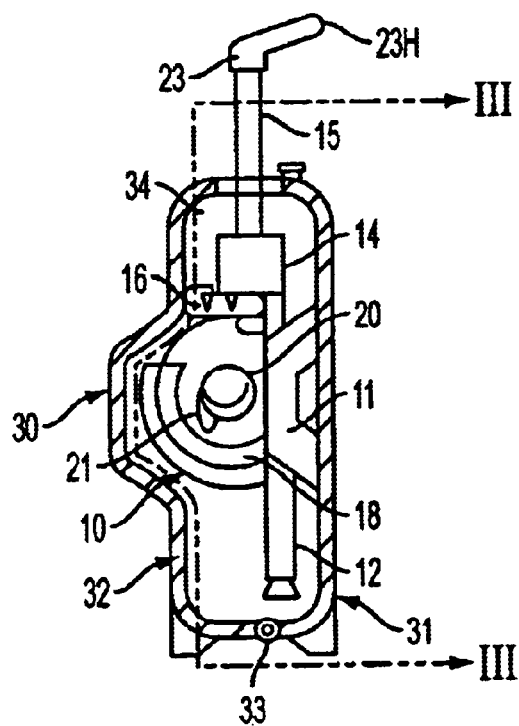
FIG. 2 is a partial cross-sectional side view of the slide miter saw of FIG. 1 in a carrying case.
Figure 3:
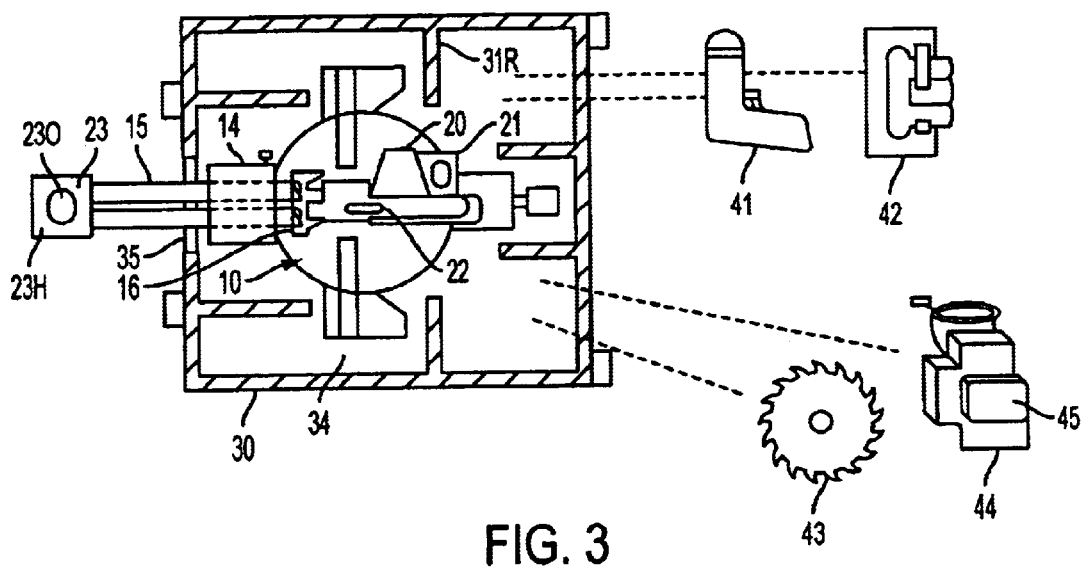
FIG. 3 is a partial cross-sectional view along line III—III of FIG. 2.

The invention is now described with reference to the accompanying figures, wherein like numerals designate like parts. Referring to FIGS. 1–3, a slide miter saw 10 preferably has a base 11, a table 12 rotatably connected to the base 11, a support housing 14 pivotally connected to table 12, at least one (and preferably two) rail(s) 15 slidably connected to the support housing 14, and a saw assembly which comprises a trunnion 16 attached to one end of the rail(s) 15, a pivot arm 17A pivotably attached to trunnion 16, a motor 20, a blade 19 driven by the motor, an upper blade guard 17 for covering an upper part of blade 19, and a lower blade 18 pivotally attached to the upper blade guard 17 for covering a lower part of blade 19. Preferably the motor 20 is attached to the upper blade guard 17. These elements are well known in the art. Persons skilled in the art are referred to U.S. Pat. No. 6,067,885, which is wholly incorporated by reference herein.

A handle 21 may be provided on the housing covering motor 20 to allow the user to move the saw assembly downwardly for cutting a workpiece. In addition, a carrying handle 22 may be provided on the pivot arm 17A and/or upper blade guard 17 for carrying the miter saw 10.

If more than one rail 15 is used, it is typical to connect them with a connector 23. The rails 15 can be press-fit into connector 23 or held in place by screws. It is preferable to shape the connector to provide a handle portion 23H, preferably defining an opening 23O, which allows the user to grasp the handle portion 23H. Preferably, the part of the handle portion 23H grasped by the user is disposed below the rails 15. In addition, handle portion 23H may completely enclose opening 23O.

Providing such handle at the end of rails 15 enables the user to carry the miter saw 10 in a substantially vertical position, which is more manageable. Alternatively, it provides two places for two persons to comfortably grasp the miter saw 10 for carrying: handle 22 and handle portion 23H.

Referring to FIGS. 2–3, miter saw 10 may be disposed in a carrying case 30. Preferably, carrying case 30 includes a container 31 and a lid 32. The lid 32 is pivotally interconnected with the container 31 at a hinge 33 such that the lid 32 can pivot about an axis of rotation relative to the container 31. When the lid 32 is in its closed position, the carrying case 30 thus has a container cavity 34 that is configured to contain, transport, and protect miter saw 10. Persons skilled in the art will appreciate that carrying case 30 may also carry other power tools, such as drill 41, circular saw 42, etc., or accessories, such as blades 43, battery chargers 44, battery packs 45, etc., in addition to miter saw 10.

Preferably, container 31 and lid 32 have as double-walled blow molded construction. Both may be formed of a thermoplastic material suitable for blow-molding, preferably polyethylene having a room temperature elastic modulus of between about 80,000 and 260,000 psi at room temperature. Other suitable materials include polypropylene, polystyrene, acrylonitrile-butadiene-styrene (ABS), and copolymers thereof. Persons skilled in the art are referred to U.S. Pat. No. 6,315,154, which is wholly incorporated herein by reference, for more information.

Container 31 may have ribs 31R for delimiting the container cavity 34 and/or locating miter saw 10, or the other power tools and accessories.

Preferably, carrying case 30 will have an opening 35 on container 31 and/or lid 32 for allowing handle 23H and/or rails 15 to extend therethrough. Accordingly, the user can use handle 23H for carrying miter saw 10, as well as container case 30 and all the other power tools and/or accessories disposed therein.

Persons skilled in the art may recognize other additions or alternatives to the means disclosed herein. However, all these additions and/or alterations are considered to be equivalents of the present invention.

What is claimed is:

1. A miter saw comprising:
   a base;
   a table rotatably attached to the base;
   a support housing pivotally connected to the table, the support housing pivoting about a substantially horizontal axis;
   at least one rail slidably connected to the support housing having first and second ends, the at least one rail being slidable in a direction substantially parallel to the substantially horizontal axis;
   a saw assembly pivotally attached to the first end of the at least one rail and movable between a front position and a rear position, the saw assembly comprising a trunnion disposed on the at least one rail, a pivot arm pivotally attached to the trunnion, an upper blade guard connected to the pivot arm, a motor attached to the upper blade guard, and a blade driven by the motor, wherein an angle of the blade relative to the table is changeable by rotating the saw assembly, the at least one rail, and the support housing about the substantially horizontal axis; and
   a first carrying handle provided on the second end of the at least one rail, wherein the first carrying handle extends below the at least one rail.

2. The miter saw of claim 1, wherein the first carrying handle defines an opening.

3. The miter saw of claim 1, wherein the at least one rail is press-fit unto the first carrying handle.

4. The miter saw of claim 1, further comprising a second carrying handle connected to at least one of the pivot arm and the upper blade guard.

5. The miter saw of claim 1, wherein the miter saw is storable within a carrying case.

6. The miter saw of claim 5, wherein the carrying handle extends beyond the carrying case.

7. The miter saw of claim 5, wherein the carrying case carries the miter saw and another power tool.

8. The miter saw of claim 5, wherein the carrying case carries the miter saw and another accessory.

9. The miter saw of claim 5, wherein the carrying case comprises a container and a lid pivotably connected to the container.

10. The miter saw of claim 9, wherein the container has a double-walled blow-molded construction.

11. The miter saw of claim 9, wherein the lid has a double-walled blow-molded construction.

12. A miter saw kit comprising:
    a miter saw comprising:
       a base;
       a table rotatably attached to the base;
       a support housing connected to the table;
       at least one rail slidably connected to the support housing;
       a saw assembly pivotally attached to the at least one rail and movable between a front position and a rear position, the saw assembly comprising a trunnion disposed on the at least one rail, a pivot arm pivotally attached to the trunnion, an upper blade guard connected to the pivot arm, a motor attached to the upper blade guard, and a blade driven byte motor, and
       a first carrying handle provided on the at least one rail; and
    a carrying case for storing the miter saw comprising a container and a lid pivotably connected to the container;
    the first carrying handle extending from the carrying case.

13. The miter saw kit of claim 12, wherein the first carrying handle defines an opening.

14. The miter saw kit of claim 12, wherein the first carrying handle is below the at least one rail.

15. The miter saw kit of claim 12, wherein the at least one rail is press-fit unto the first carrying handle.

16. The miter saw kit of claim 12, wherein the container has a doable-walled blow-molded construction.

17. The miter saw kit of claim 12, wherein the lid has a double-walled blow-molded construction.

18. The miter saw kit of claim 12, wherein the carrying case further stores another power tool.

19. The miter saw of claim 12, wherein the carrying case farther stores another accessory.

* * * * *